US007917446B2

(12) United States Patent
Atkinson

(10) Patent No.: US 7,917,446 B2
(45) Date of Patent: Mar. 29, 2011

(54) LATENCY LOCATOR

(75) Inventor: Jon E. Atkinson, Phonenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 329 days.

(21) Appl. No.: 11/932,508

(22) Filed: Oct. 31, 2007

(65) Prior Publication Data
US 2009/0112651 A1    Apr. 30, 2009

(51) Int. Cl.
*G06Q 20/00*    (2006.01)
(52) U.S. Cl. ............ 705/64; 705/14.23; 705/75; 705/79
(58) Field of Classification Search ............... 705/14.23, 705/64, 75, 79
See application file for complete search history.

(56) References Cited

U.S. PATENT DOCUMENTS

| | | | | |
|---|---|---|---|---|
| 5,850,386 | A * | 12/1998 | Anderson et al. | 370/241 |
| 6,039,245 | A * | 3/2000 | Symonds et al. | 235/379 |
| 6,453,345 | B2 * | 9/2002 | Trcka et al. | 709/224 |
| 6,550,057 | B1 * | 4/2003 | Bowman-Amuah | 717/126 |
| 6,981,146 | B1 * | 12/2005 | Sheymov | 713/172 |
| 7,114,183 | B1 * | 9/2006 | Joiner | 726/23 |
| 7,287,076 | B2 | 10/2007 | Ewanchuk et al. | |
| 2001/0034702 | A1 * | 10/2001 | Mockett et al. | 705/39 |
| 2002/0120727 | A1 * | 8/2002 | Curley et al. | 709/223 |
| 2003/0033404 | A1 | 2/2003 | Richardson | |
| 2003/0145039 | A1 * | 7/2003 | Bonney et al. | 709/202 |
| 2003/0217144 | A1 * | 11/2003 | Fu et al. | 709/224 |
| 2004/0107252 | A1 | 6/2004 | Futa et al. | |
| 2004/0230536 | A1 * | 11/2004 | Fung et al. | 705/64 |
| 2004/0233849 | A1 * | 11/2004 | Cole | 370/238 |
| 2005/0055399 | A1 * | 3/2005 | Savchuk | 709/203 |
| 2005/0076111 | A1 * | 4/2005 | Cherkasova et al. | 709/224 |
| 2005/0108573 | A1 * | 5/2005 | Bennett et al. | 713/201 |

(Continued)

FOREIGN PATENT DOCUMENTS

CN          1897534 A  *  1/2007

OTHER PUBLICATIONS

"ISO 8583—Introduction to the Protocol". Posted Jul. 11, 2006. Retrieved Apr. 5, 2010 via Wayback Machine. All pages. http://www.kuriositaet.de/iso8583/introduction.html.*

(Continued)

*Primary Examiner* — Evens J Augustin
*Assistant Examiner* — Calvin K Cheung
(74) *Attorney, Agent, or Firm* — Snell & Wilmer L.L.P.

(57) ABSTRACT

A method for capturing data packets sent on a network for evaluating response time performance, the network including a financial institution and a partner bank. The method includes associating a captured data packet sent to the partner bank with a captured data packet received from the partner bank, by comparing at least one coded field of a data portion of the captured data packet sent to the partner bank with at least one coded field of a captured data portion of the data packet received from the partner bank. The method also includes measuring a response time of the associated data packet received from the partner bank, relative to a transmission time of the captured data packet sent to the partner bank. The method further includes transmitting an alert message upon determining that the response time is not within an adjustable predetermined threshold, wherein the alert message includes data from a data portion of the associated data packets.

16 Claims, 6 Drawing Sheets

U.S. PATENT DOCUMENTS

| | | | | |
|---|---|---|---|---|
| 2005/0278565 | A1* | 12/2005 | Frattura et al. | 714/5 |
| 2006/0095368 | A1* | 5/2006 | Stretton | 705/39 |
| 2006/0098647 | A1* | 5/2006 | Muehl et al. | 370/389 |
| 2006/0168185 | A1 | 7/2006 | McCall et al. | |
| 2006/0222013 | A1* | 10/2006 | Ban | 370/474 |
| 2006/0224919 | A1* | 10/2006 | McIver et al. | 714/12 |
| 2007/0162754 | A1* | 7/2007 | Sheymov | 713/172 |
| 2007/0192863 | A1* | 8/2007 | Kapoor et al. | 726/23 |
| 2007/0282690 | A1* | 12/2007 | Randazza et al. | 705/17 |
| 2008/0017703 | A1* | 1/2008 | Lu et al. | 235/379 |
| 2008/0229289 | A1* | 9/2008 | Nauman et al. | 717/136 |

OTHER PUBLICATIONS

"TranScan/8583 User's Manual". Mar. 24, 2000. All pages. http://www.transcan.com.*

"OnTrac Consulting, Inc: TranScan/8583". Posted Feb. 5, 2005. Retrieved Apr. 5, 2010 via Wayback Machine. All pages. http://www.transcan.com/transcan_8583.html.*

"Best Practices Recommendations for the Use of Magnetic Stripes Version 2.0". Apr. 1996. All pages.*

"TranScanLAN Response Time Reporter User's Manual Statistics File V2.0". Mar. 20, 2003. All pages.*

Internet Society. "TCP—How it works". Jul. 2004. All pages. http://isoc.org/wp/ispcolumn/files/2004/07/tcp1.pdf.*

"Global Credit Authorization Guide v3.2". Aug. 11, 2006. All pages. http://www.ncosc.net/SECP/Exhibit1-AmericanExpressGlobalCreditAuthorizationGuide.pdf.*

"A Laymans Guide to Understanding the ISO8583 Financial Transaction Message". Retreived Apr. 6, 2010. All pages. http://www.donyeo.com/img/iso8583.pdf.*

"TranScan Viewer & TranScan/LAN Version 5.5". Nov. 13, 2003. All pages.*

"Frontline Test System Ethertest User's Guide". Posted Feb. 5, 2005. Retrieved Apr. 5, 2010 via Wayback Machine. See "Download TranScan Documentation".*

"Download TranScan Documentation". Posted Feb. 5, 2005. Retrieved Apr. 5, 2010 via Wayback Machine. http://www.transcan.com/download.html.*

"OnTrac Consulting Inc: TranScan/LAN". Posted Feb. 5, 2005. Retrieved Apr. 5, 2010 via Wayback Machine. http://www.transcan.com/index.html.*

Gralla, P. How The Internet Works. 2004. Que Publishing. 7th Edition. All pages.*

International Search Report and Written Opinion of the International Searching Authority, PCT/US08/80581, Jan. 5, 2009.

* cited by examiner

FIG. 5

Modify Tracked Fields

Pattern Match Fields

| Enabled | Field ID | Type | Request Offset | Length | Response Offset |
|---------|----------|------|----------------|--------|-----------------|
| ☑ | cc | EBCDIC | 16 | 15 | 16 |
| ☑ | TRAN AMT | EBCDIC | 38 | 12 | 38 |
| ☑ | Recon Amt | EBCDIC | 50 | 12 | 50 |
| ☐ | | ASCII | 0 | 0 | 0 |

[Edit Field]

Pattern Match Fields

| Enabled | Field ID | Type | Request Offset | Length |
|---------|----------|------|----------------|--------|
| ☐ | | ASCII | 0 | 0 |
| ☐ | | ASCII | 0 | 0 |
| ☐ | | ASCII | 0 | 0 |
| ☐ | | ASCII | 0 | 0 |
| ☐ | | ASCII | 0 | 0 |
| ☐ | | ASCII | 0 | 0 |

[Edit Field]

[OK]

LATENCY LOCATOR

BACKGROUND OF THE INVENTION

1. Field of the Invention

The present invention generally relates to locating latencies in financial transactions on a network, and, more particularly, to capturing ISO 8583 messages, sent between a financial institution and a card issuing partner bank, for the purposes of evaluating whether authorization traffic along the network is being responded to in a timely manner.

2. Related Art

Consumers very often use financial transaction instruments as convenient forms of payment for purchases of goods and/or services ("goods/services") instead of cash or checks. Traditionally, a "financial transaction instrument" is embodied as a card-shaped device, also referred to herein as a "card," and may be any of the following: a traditional "plastic" transaction card (e.g., a credit card, a charge card, a debit card, a pre-paid or stored-value card, or the like); a titanium-containing, or other metal-containing, transaction card; a clear or translucent transaction card; a foldable or otherwise unconventionally-sized transaction card; or any other type of card used in connection with a financial transaction.

A typical financial transaction involves a number of parties. These parties can have multiple roles, depending on the type of transaction. For example, in one type of transaction, the main parties involved can include a "customer," a "merchant," an "acquirer," a "financial institution," and a "card issuing partner bank." In this example, the partner bank (for example Citibank) issues a financial transaction instrument such as a card to the customer, and the card is branded with the name of the financial institution. When the customer uses the card, he or she swipes the card at the merchant's point of sale (POS) terminal in order to pay for the item.

The merchant's POS terminal sends the transaction to the acquirer. The acquirer has connections to multiple financial institutions, since it is impractical for each merchant to have connections to each financial institution. (However, in some cases, larger merchants act as their own acquirer.) The acquirer delivers the transaction to the appropriate financial institution, which delivers the transaction to the appropriate partner bank for authorization. Once authorization by the partner bank occurs, the transaction returns to the financial institution, is delivered to the acquirer, and then to the merchant's POS terminal. It is of course to be understood that the above structure is only one example, and that various parties to the transaction can assume various roles.

In order to enable a financial transaction to take place in the example provided above, the financial institution, therefore, engages in a relationship with one or more card issuing partner banks, and communications and transactions occur over a network. Typically, a financial institution's product (for example, software and/or hardware) is installed at the partner bank premises for connectivity into the financial institution's authorization network.

One problem is that authorization traffic from the partner bank, for example, between the financial institution's product and the partner bank, is often not responded to in a timely manner. Because of this, there is a need to monitor the authorization traffic and validate whether in each case such traffic is being timely responded to so that latencies can be located. Previous approaches to solving this problem have had drawbacks.

For example, in one conventional approach, a product is installed at the partner bank premises for connectivity into the financial institution's authorization network, and servers are installed to log traffic. When there is an issue with response times, the log is interrogated or analyzed to determine if the partner bank caused the latency. However, this approach can be very time consuming, particularly if the financial institution has many partner banks connected to its infrastructure. Moreover, as a practical matter, there are limitations to the amount of data that can be stored, and support of the servers can be cost prohibitive.

There is a need for a less time consuming and more cost effective approach for locating latencies in authorization traffic in a network.

BRIEF DESCRIPTION OF THE INVENTION

The present invention meets the above-identified needs by providing methods, systems, apparatuses, and computer program products for capturing messages, for example ISO 8583 messages, initiated by a transaction acquirer to a financial institution and sent between that financial institution and a partner bank on a network for the purposes of evaluating and relaying response time performance.

One advantage of the present invention is that a less time consuming and more cost effective approach can be provided for locating latencies in authorization traffic along a network.

In accordance with one embodiment of the present invention, there is provided a computer program product comprising a computer-usable medium having control logic stored therein for causing a computer to capture data packets on a network for evaluating response time performance, the network including a financial institution and a partner bank. First computer-readable program code causes the computer to capture a first data packet sent from the financial institution to the partner bank, the first data packet including an authorization request for a transaction. Second computer-readable program code causes the computer to check whether the captured first data packet includes a first pattern in a coded field. Third computer-readable program code causes the computer to capture a second data packet sent from the partner bank to the financial institution. Fourth computer-readable program code causes the computer to check whether the captured second data packet has a second pattern in a coded field that corresponds to the first pattern. Fifth computer-readable program code causes, upon determining that the captured second data packet has the second pattern, the computer to check whether at least one additional coded field of the captured second data packet matches at least one additional coded field of the captured first packet to determine whether a match has occurred. Sixth computer-readable program code causes the computer, upon determining that a match has occurred, to determine whether a response time of the second data packet relative to a transmission time of the first data packet exceeds a predetermined threshold, and, if so, to transmit an alert message.

In accordance with another embodiment of the present invention, there is provided a computer program product comprising a computer-usable medium having control logic stored therein for causing a computer to capture data packets in the form of ISO 8583 messages sent on a network for evaluating response time performance, the network including a financial institution and a partner bank. First computer-readable program code causes the computer to associate a captured data packet sent to the partner bank with a captured data packet received from the partner bank, by comparing at least one coded field of a data portion of the captured data packet sent to the partner bank with at least one coded field of a captured data portion of the data packet received from the partner bank. Second computer-readable program code causes the computer to measure a response time of the associated data packet received from the partner bank, relative to a transmission time of the captured data packet sent to the partner bank. Third computer-readable program code causes the computer to transmit an alert message upon determining that the response time is not within an adjustable predetermined threshold.

In accordance with another embodiment of the present invention, there is provided a method for capturing data packets sent on a network for evaluating response time performance, the network including a financial institution and a partner bank. The method includes associating a captured data packet sent to the partner bank with a captured data packet received from the partner bank, by comparing at least one coded field of a data portion of the captured data packet sent to the partner bank with at least one coded field of a captured data portion of the data packet received from the partner bank. The method further includes measuring a response time of the associated data packet received from the partner bank, relative to a transmission time of the captured data packet sent to the partner bank. The method further includes transmitting an alert message upon determining that the response time is not within an adjustable predetermined threshold, wherein the alert message includes data from a data portion of the associated data packets.

In accordance with another embodiment of the present invention, there is provided a computer system including a processor and a memory storing control logic for causing the processor to capture data packets in the form of ISO 8583 messages sent on a network for evaluating response time performance, the network including a card issuer and a partner bank. First computer-readable program code associates a captured data packet sent to the partner bank with a captured data packet received from the partner bank, by comparing at least one coded field of a data portion of the captured data packet sent to the partner bank with at least one coded field of a captured data portion of the data packet received from the partner bank. Second computer-readable program code measures a response time of the associated data packet received from the partner bank, relative to a transmission time of the captured data packet sent to the partner bank. Third computer-readable program code transmits an alert message upon determining that the response time is not within an adjustable predetermined threshold.

In accordance with another embodiment of the present invention, there is provided a method for capturing data packets sent on a financial network for evaluating response time performance. The method includes associating a captured data packet sent to a participant with a captured data packet received from the participant, by comparing at least one coded field of a data portion of the captured data packet sent to the participant with at least one coded field of a captured data portion of the data packet received from the participant. The method also includes measuring a response time of the associated data packet received from the participant, relative to a transmission time of the captured data packet sent to the participant. The method further includes transmitting an alert message upon determining that the response time is not within an adjustable predetermined threshold, wherein the alert message includes data from a data portion of the associated data packets.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIGS. 4-6 show screen shots showing an example embodiment of the present invention.

DETAILED DESCRIPTION

I. Overview

Figure 1:
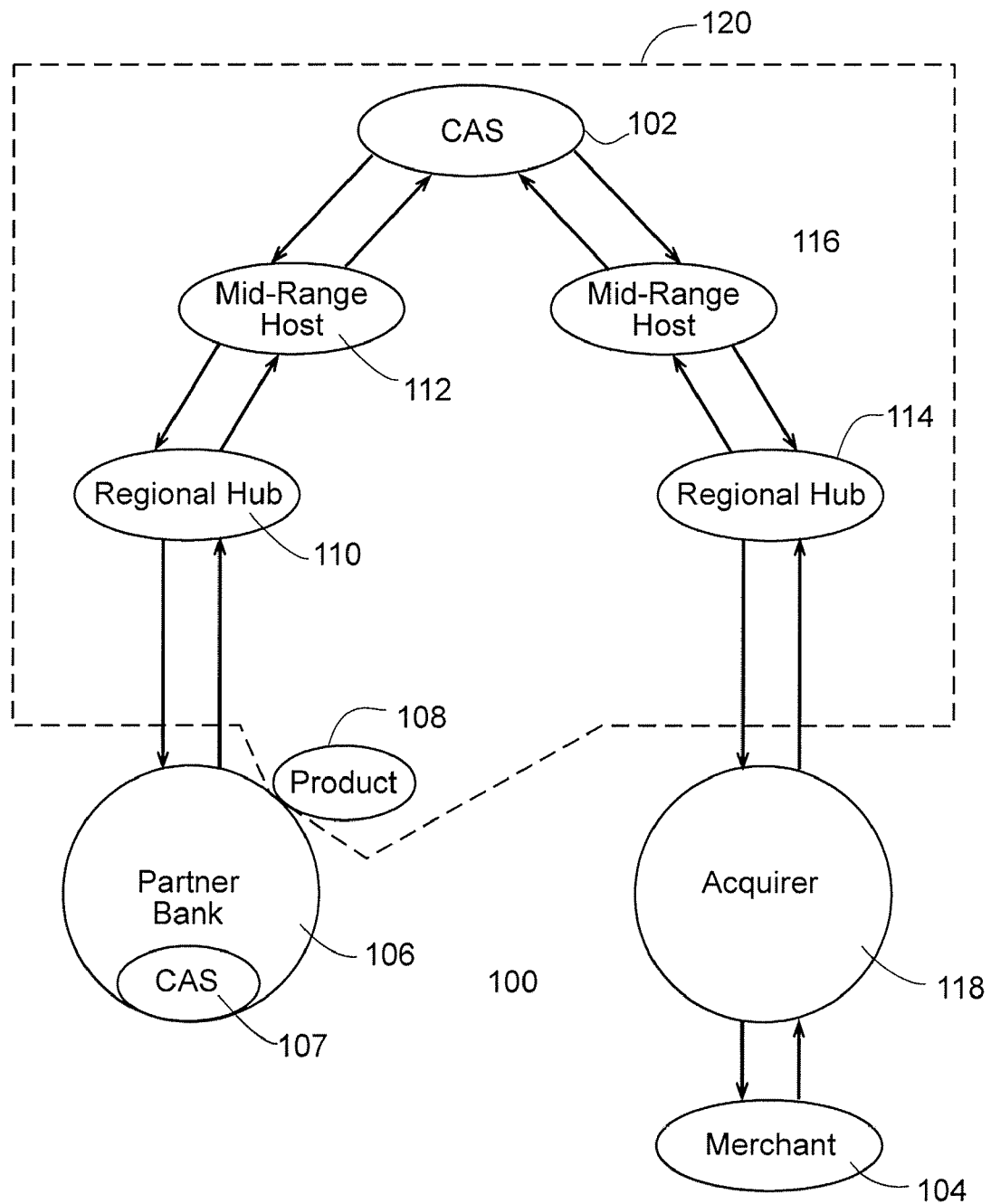
FIG. 1 is a diagram illustrating a network including various parties in a financial transaction according to an example embodiment of the present invention.

The present invention is directed to methods, systems, apparatuses, and computer program products for capturing messages, for example ISO 8583 messages, sent between a financial institution and a partner bank for the purposes of evaluating and relaying response time performance. With the present invention, latencies can be located in authorization traffic along the network and it can be validated whether authorization traffic along the network is being responded to in a timely manner.

Of course, while the present invention is described in the context of messages sent between a financial institution and a partner bank, it is of course to be understood that the invention is not limited to such, and that the invention can readily apply to data messages sent between any two relevant parties in a network, at any applicable point in the network. Communication between parties or hosts on any network can leverage the present invention to capture unique data fields from and to the systems to resolve response time. Typical packet analysis tools can leverage the protocol that houses the data to determine response times; however, this can be misleading in that the protocol will respond with an ACK and not data, and therefore tracked response times are not validating the response of data being received to the request. This is pertinent in protocols not understood or decoded by the packet analyzer.

In one embodiment of the present invention, a data packet transmitted from a financial institution to a partner bank is captured, the data packet relating to an authorization request, and a specific pattern (e.g., 1100) is searched for in a coded field of the data packet. Further, a data packet transmitted from a partner bank to a financial institution is captured, and a corresponding pattern (e.g., 1110) is searched for in a coded field of that data packet. Once a data packet transmitted from the partner bank is found which has a pattern (e.g., 1110) corresponding to the pattern (e.g., 1100) of the data packet transmitted from the financial institution, then one or more additional fields of each data packet are compared to confirm that the additional field(s) match and that the packets correspond to each other. Such additional fields can include, for example, credit card number, transaction amount, reconciliation amount, date, time, etc. Once all matches are confirmed, it is checked whether the response time exceeded a predetermined time period (e.g., 2 seconds) and, if so, an alert is sent to the financial institution's monitoring system. If no data packet transmitted from the partner bank, having corresponding and matching fields as described above, is found within a second predetermined time period (e.g., 7 seconds), it is determined that the response has timed out and an alert is sent to the financial institution's monitoring system.

II. System

The present invention is now described in terms of an exemplary system in which the present invention, in an embodiment, would be implemented. This is for convenience only and is not intended to limit the application of the present invention. It will be apparent to one skilled in the relevant art(s) how to implement the present invention in alternative embodiments.

The present invention in one embodiment relates to transaction accounts of financial transaction instruments including traditional plastic transaction cards (e.g., a credit card, a charge card, a debit card, a pre-paid or stored-value card, or the like), titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid, gift, or stored value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

With regard to use of a transaction account, users may communicate with card issuers or merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

"Merchant" includes any individual, business, entity, customer, hardware and/or software that receives a card number to facilitate a transaction, whether or not in exchange for goods or services. For example, a merchant may be an online bookstore, or a local restaurant.

In general, transaction accounts may be used for transactions between the user and merchant through any suitable communication device, such as, for example, a telephone network, an intranet, the global public Internet, a point of interaction device (e.g., a point of sale (POS) device, personal digital assistant (PDA), mobile telephone, kiosk, etc.), online communications, off-line communications, wireless communications, and/or the like.

An "account," "account number," or "account code", as used herein, may include any device, code, number, letter, symbol, digital certificate, smart chip, digital signal, analog signal, biometric or other identifier/indicia suitably configured to allow a consumer to access, interact with, or communicate with a financial transaction system. The account number may optionally be located on or associated with any financial transaction instrument (e.g., a charge, credit, debit, prepaid, telephone, smart, magnetic stripe, bar code, transponder or radio frequency card). The account number may be distributed and stored in any form of plastic, electronic, magnetic, radio frequency (RF), wireless, audio and/or optical device capable of transmitting or downloading data from itself to a second device.

FIG. 1 is a diagram illustrating an example of a relationship or network 100 between various parties in a financial transaction according to an example embodiment of the present invention. In this example, a financial institution 120 controls and operates a Card authorization System (CAS) 102, mid-range hosts 112, 116, regional hubs 110, 114, and product 108. CAS 102 is a system for authorizing transactions. CAS 102 communicates with a merchant 104 through an acquirer 118, and communicates with a card issuing partner bank 106, which also has its own card authorization system 107. CAS 102 can, for example, send a data message to the partner bank 106 for authorization. Regional hubs 110, 114 and mid-range hosts 112, 116 include hardware (e.g., routing equipment) and software for maintaining the connections of the network between the parties.

In the structure described in FIG. 1, CAS 102 is utilized to switch transactions between a merchant 104 and the card authorization system 107 of the partner bank 106. The main purpose of a card authorization system is to authorize transactions, and that is the main function of the card authorization system 107 of the partner bank 106. As such, there can be great dependency on the partner bank 106 to respond in a timely manner.

It is of course to be understood that the invention is not limited to the structure of the network shown in the example provided in FIG. 1, and that the diagram illustrated in FIG. 1 is a simplified diagram. For example, a plurality of merchants or partner banks can be part of the network, and other parties, hubs, or mid-range hosts can also be part of the network. Moreover, a merchant may be connected directly to a partner bank.

In one embodiment of the present invention, a product 108 (for example, a software and/or hardware product) operated by the financial institution 120 is installed at the premises of the partner bank 106 for connectivity into the financial institution's authorization network 102. Transmission Control Protocol (TCP) traffic between the financial institution's product 108 on-site at the partner bank 106 premises and the partner bank's network is monitored to validate or confirm that authorization traffic is being responded to in a timely manner.

Figure 4:
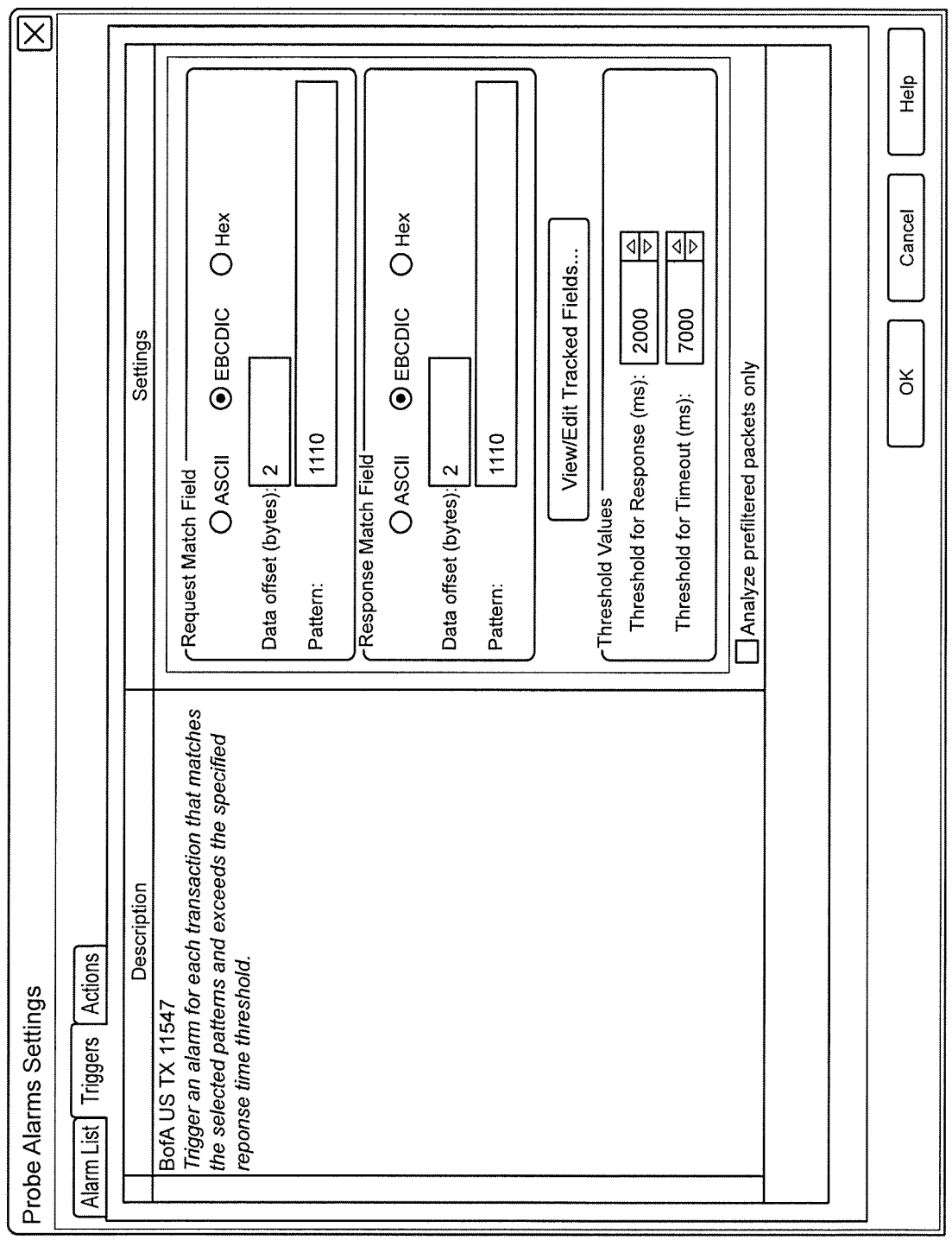

In one embodiment of the present invention, ISO 8583 messaging protocol is utilized in processing authorizations. ISO 8583 is an International Organization for Standardization standard for systems that exchange electronic transactions made by cardholders using transaction cards. FIG. 4, which is explained in further detail below, shows an 1100 pattern and shows that both the 1100 pattern and 1110 pattern are in offset 2 of the data portion of the packet. Other fields, such as credit card, transaction ID, and transaction amount show their offset in FIG. 5, which is also explained in further detail below. It is of course to be understood that the present invention is not limited to use with only ISO 8583 messages.

Accordingly, the present invention can look at anything in the data portion of a packet, and therefore can be used for any protocol having data. For example, the present invention can look at an FTP file transfer for the start of the file transfer and then look for the end of the file transfer. Then it would have the duration of the file transfer and can pull the file name and size from the data. Items such as this can be very useful in checking response times and durations, and in pulling unique information from packets.

III. Process

Figure 2:
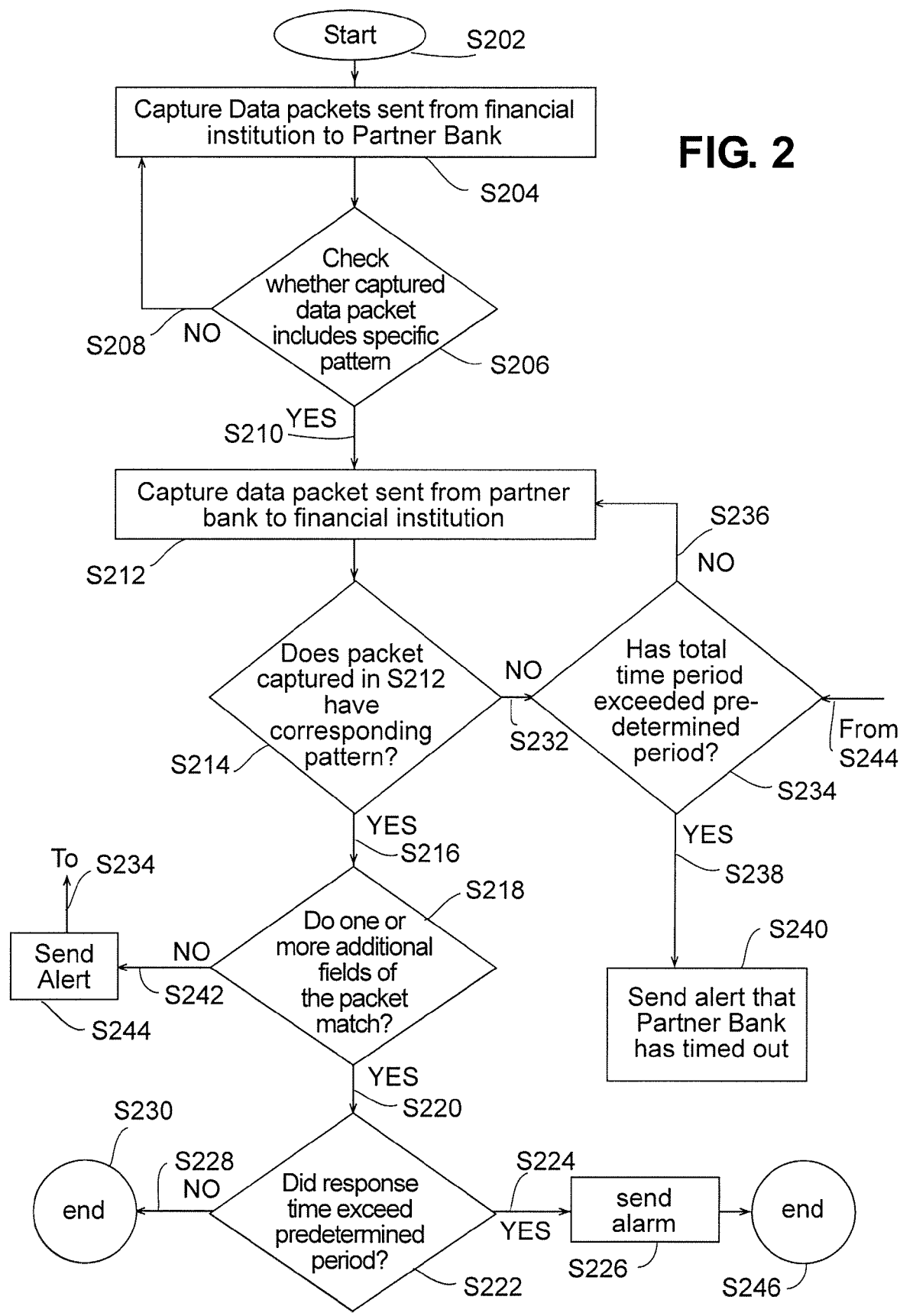
FIG. 2 shows a flowchart illustrating a method of the present invention according to one embodiment.

FIG. 2 shows a flowchart illustrating a method of the present invention, according to one embodiment. In step S202, the method is initiated. In step S204, the method captures a data packet or packets sent from a financial institution 120 to a partner bank 106, each data packet relating to an authorization request for a transaction. In step S206 the method checks whether the data packet includes a coded field in the form of a specific first pattern (e.g. 1100) located in the data portion of the packet. If the data packet does not include a coded field in the form of the specific first pattern that was searched for (S208), the method returns to step S204. If the data packet does include a coded field in the form of the specific first pattern that was searched for (S210), the method proceeds to step S212.

In step S212, the method captures a data packet sent from the partner bank 106 to the financial institution 120. In step S214, the method checks whether the data packet captured in step S212 (i.e., a data packet sent from the partner bank 106 to the financial institution 120) has a coded field in the form of a second pattern (e.g., 1110) that corresponds to the first pattern (e.g., 1100). If not (S232), the captured packet is not an authorization response message, and the method proceeds to step S234 to check whether the total time period has exceeded a predetermined period for time-out (e.g., 7 seconds). If the total time period has not exceeded the predetermined time period (S236), the method returns to step S212; if it has (S238), the method proceeds to step S240 and an alert is sent that the partner bank 106 has timed out.

If (step S216) the data packet captured in step S214 (i.e., a data packet sent from the partner bank to the card issuer) has a second pattern (e.g. 1110) that corresponds to the first pattern (e.g. 1100), then the method proceeds to step S218 to check whether one or more additional fields of the data packets having the corresponding patterns match. The additional fields can include the credit card number, the transaction amount, the transaction ID field, the reconciliation amount, etc. If one or more additional fields of the data packets captured in steps S204 and S206 do not match (S242), an alert is sent in step S244, and the method proceeds to step S234 to determine whether the total time period has exceeded a predetermined period for time-out.

If one or more of the additional fields do match (S220), then the method proceeds to step S222 to determine whether the response time exceeded a predetermined time period (for example, 2 seconds). The response time is the time period starting when the data packet was handed off from the financial institution 120 to the partner bank 106, and ending when the corresponding data packet was transmitted from the partner bank 106 to the financial institution 120. The method is observing the packet/request go to the partner bank from the financial institution's last point of ownership to the portion of the network owned by the partner bank, and is then observing the packet/response come from the partner bank to the first point of ownership of the financial institution. If the response time exceeded the predetermined time period for response (S224), an alarm or other indicator is sent in step S226, and then the process ends (S246). If the response time did not exceed that predetermined time period (S228), then the method ends in step S230.

As described, then, the method of FIG. 2 includes analyzing the data portion of a packet, matching coded fields, and comparing additional fields, to verify that the response from a partner bank 106 is the response to each specific authorization request.

As also described in the method of FIG. 2, automated alerts to authorization messages (e.g., ISO 8583 messages) can be received when a partner bank 106 does not respond within a predefined threshold or time period. Accordingly, data can be acquired to determine which party—e.g., the partner bank 106 or the financial institution 120—has impacted service level objects. Without this data, for example, a financial institution 120 may be unable to determine whether a partner bank 106 negatively impacted the transaction and, therefore, the financial institution 120 may be unfairly penalized.

In one embodiment of the present invention, the method is automated and can quickly send important information about a specific transaction to a central monitoring station to the financial institution 120. For example, instead of waiting for notification from the CAS 102 as to the issues that occurred in the previous day and manually looking into a remote log file thousands of miles away, alerts can be sent as the problem occurs to the central console or monitoring system and the problem can be addressed immediately with all the data from that particular transaction.

The present invention can therefore pick any portion of the authorization message and send that portion in, for example, a Simple Network Management Protocol (SNMP) alert. In this way, whatever data is required from that transaction for the financial institution 120 to inform the partner bank 106 of the issue is available. Information such as credit card number, transaction amount, date, time, etc., can be compared from the sent authorization request to the response from the partner bank 106 to validate that the response time calculated is related to the exact transaction originally sent. Further, the compared date can be sent along with any additional data required in a trap (e.g. a Simple Network Management Protocol or SNMP notification or alert) to the central console.

Accordingly, the present invention provides one-time trouble shooting for proactive monitoring and online alerting. In one embodiment of the present invention, TCP/IP headers can be ignored and determinations can be made not only based on the data, but also based on comparing data of multiple packets to find two that match, and then pulling information from the data portion of the packet to send as an alert. This can be necessary in dealing with ISO 8583 messaging.

The present invention in one embodiment is a packet capture tool or application that can monitor, filter, alert, store, etc., packets as they cross a network segment. The following are screen shots of the present invention in one embodiment. The hardware and software of the present invention may be called a "probe."

Figure 6:
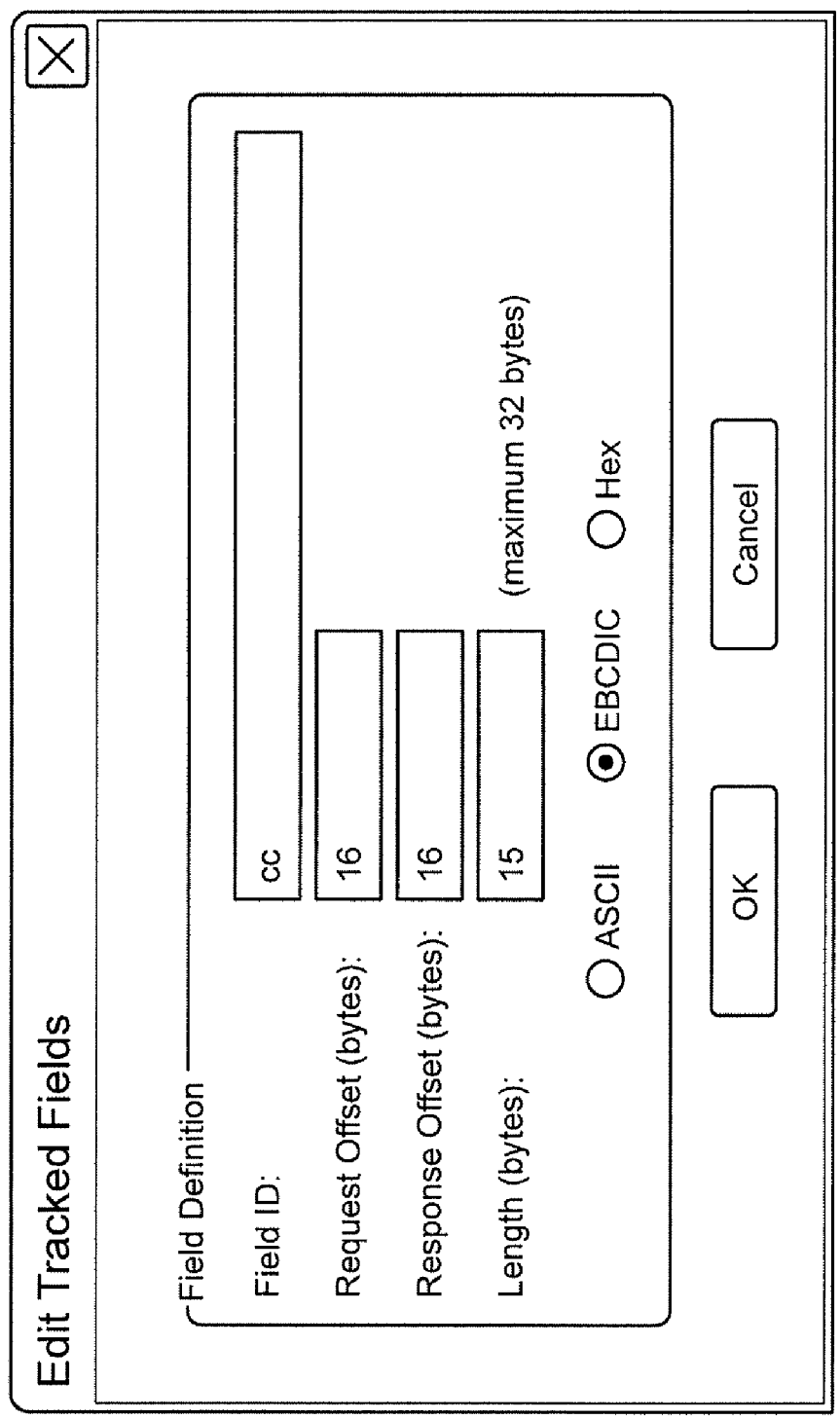

FIGS. 4-6 are screen shots showing an example embodiment of the present invention. FIG. 4 is a screen shot showing triggers of probe alarm settings for a search. The probe may for example be incorporated into the product 108 of the financial transaction institution 120. According to FIG. 4, an alarm is triggered for each transaction that matches the selected patterns and that exceeds the specified response time threshold. In this example, a pattern is part of an ISO 8583 message.

The Request Match Field of FIG. 4 shows that a packet, among the packets being sent from a financial institution 120 to a partner bank 106, is being searched for that has the pattern 1100 in its data portion at a data offset of 2 bytes. Then, as FIG. 4 shows in the Response Match Field, a packet, among the packets being sent from the partner bank 106 to the financial institution 120, is being searched for that has the pattern 1110 in its data portion at a data offset of 2 bytes.

As shown in the View/Edit Tracked Fields of FIG. 4 (see also FIGS. 6 and 7), additional fields can be entered for comparison in order to validate that the response matches the request sent. Further, FIG. 4 shows the thresholds that are set. In this example, a Threshold for Response can be entered, and a Threshold for Timeout can be entered. If the partner bank 106 response is over 2 seconds (2000 ms), the partner bank 106 has exceeded the response threshold and an alert is sent. If the partner bank response is over 7 seconds (7000 ms), or the partner bank 106 does not respond, an alert will be sent stating that the partner bank 106 has timed out.

FIG. 5 is a screen shot showing tracked pattern match fields and tracked notification fields, in which tracked fields can be modified. The fields defined in the Pattern Match Fields portion of FIG. 5 are compared between the sending and responding messages (i.e. the data packets having patterns 1100 and 1110, respectively, in FIG. 4), in order to validate that the appropriate messages are being evaluated. The fields being matched in this example are credit card number, transaction amount, and reconciliation amount (of course, the present invention is not limited to these fields). The Pattern Match Fields and Notification Fields are sent to a central monitoring console if the thresholds are exceeded.

FIG. 6 is a screen shot showing the definition of the first tracked field, i.e. the credit card number field. In the Edit Tracked Field interface, all options can be configurable and no item is statically assigned; accordingly, items other than packets having corresponding patterns (such as 1100 and 1110) can be tracked for responsiveness.

Accordingly, the present invention in this embodiment goes beyond merely looking at TCP/IP headers and performs pattern matches on any portion of the packet. The present invention not only performs matches on a pattern, such as the 1100 field mentioned above, but waits to receive a packet having an 1110 field as well. Once a packet having an 1110 field is received, the fields in the match section of each packet are compared to confirm that they are all the same. For example, if the credit card number, amount, date, and time in the packet having the 1100 field match those in the packet having the 1110 field, the present invention compares the times it saw each packet to see if the packet having the 1110 field that matches came back from the partner bank within the predetermined time period (e.g. 2 seconds). If it did not exceed that threshold, nothing is done. If it did exceed that threshold, an alarm is logged, a beep sounds (or another indicator indicates), and an SNMP trap is sent to a central console of the card issuer. There also are options to send a page and an email, if necessary.

The present invention in this embodiment tracks the time it takes a partner bank 106 to respond to the data packet having the specified pattern (e.g., 1100) with a data packet having a corresponding pattern (e.g., 1110), at the point at which the partner bank 106 is connected to the card issuer's network. The time can be tracked in each transaction to provide alerts when a partner bank 106 responds too slowly or not at all, and to provide trending reports to monitor gradual gains or spikes in response times. An alert provides enough information about the transaction so that the transaction can be isolated in CAS 102 and the partner bank 106 can track it on its side. Information such as credit card number, date, time, Stan ID or transaction ID, etc. can be provided. The alert can be an alarm, a text message, or any other suitable form. The alert can contain "real" data from the data portion of the packet and can be unique to the data that is in the packet.

The following is a description of specifications for a system according to one example embodiment of the present invention. Of course, the present invention is not limited to this example.

The system may have two fields for ISO messaging, e.g., variable length and any offset in the data portion of packet. For example, 1100, 1110, 1200, 1210, 1120, and 1130. The system may have three fields for matching content in the packet to validate that the request and the response are part of the same transaction. The field for the response time may be set at, e.g., 2 seconds, with the ability to vary that response time. For example, the response time may be varied down to, e.g., 1/10 of a second, or more or less than that.

Internet Protocol (IP) addresses can be used for source and destination packet addresses. This can be part of another filter used in conjunction with this filter. The system can send a trap containing 4 fields from the data packet. The location and size from the data portion of packet can be flexible.

The following describes example logic, which may be used in a computer program of the system for carrying out the present invention according to an embodiment thereof.

| Example Logic: |
|---|
| IF pattern = 1100 (user defined data portion of packet) |
| THEN wait "user defined period of time (8 Sec)" for |
| 1110 with match criteria |
| IF found |
|   THEN subtract 1100 time from 1110 time (This data can be |
|   provided to the trending report) |
|   IF diff time >= 2 seconds (user defined interval) |
|     THEN Alert "Partner Slow" |
|   ENDIF |
| ELSE |
|   Alert - "No Partner Response" |
| ENDIF |
| ENDIF |

By virtue of the features described herein, the present invention can identify which party (partner bank 106 or financial institution 120) caused a latency in responding to an authorization request. The present invention can eliminate brand or expense impacts of a financial institution 120 encountered due to partner-bank latency by identifying all partner-bank caused latency issues.

The present invention can improve network performance by monitoring all partner banks as to whether responsiveness is being maintained. Furthermore, even knowing that the partner banks are responding in a timely manner, by identifying latency issues the present invention can help a financial institution identify internal authorization issues more quickly.

While the present invention is described in terms of locating latencies in authorization traffic along a network between a financial institution 120 and a partner bank 106, the invention is of course not limited to that situation. The present invention can also determine whether merchant requests are being responded to by a financial institution 120 and a partner bank 106 in a timely manner. Further, the present invention can be broadly applied to analyzing messages and locating latencies in any data communication between a plurality of parties or hosts. Accordingly, the present invention can be broadly applied to other applications and industries. For example, the present invention can be used by manufacturing companies that need to maintain any timeliness of traffic and aren't able to perform that monitoring function with regard to typical tools.

Any network traffic that requires keying off of data contained in a data portion of a packet can utilize the present invention to monitor responsiveness of traffic. Of course, as noted earlier, the present invention isn't limited to supporting only ISO 8583 messaging; other types of messaging can be supported.

The present invention, as described herein, can passively capture traffic on a network segment. In one embodiment, hardware and/or software comprising a product is connected to a switch (packet analyzer), with the switch port the product is connected to having a subsequent port pointed to it for monitoring its traffic. In this example, a partner bank is connected to the financial institution's product, which may include routers and switches installed at the partner bank's location for network connectivity to the partner bank's network. The product can include circuits that then connect back to the financial institution. One port, where the partner bank is connected on each switch, can have the traffic of those ports spanned or copied from that port to the port where a packet analyzer having the features of the present invention is connected. The software can be installed on any hardware platform running, e.g., Windows XP. The hardware component can include network interface cards for capturing traffic on each of the switches and for management/sending traps. Accordingly, it is understood how a hardware component may be connected in accordance with an example embodiment of the present invention, and how the hardware component can have access to the traffic between a financial institution and a partner bank.

IV. Example Implementation

The present invention or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 3:
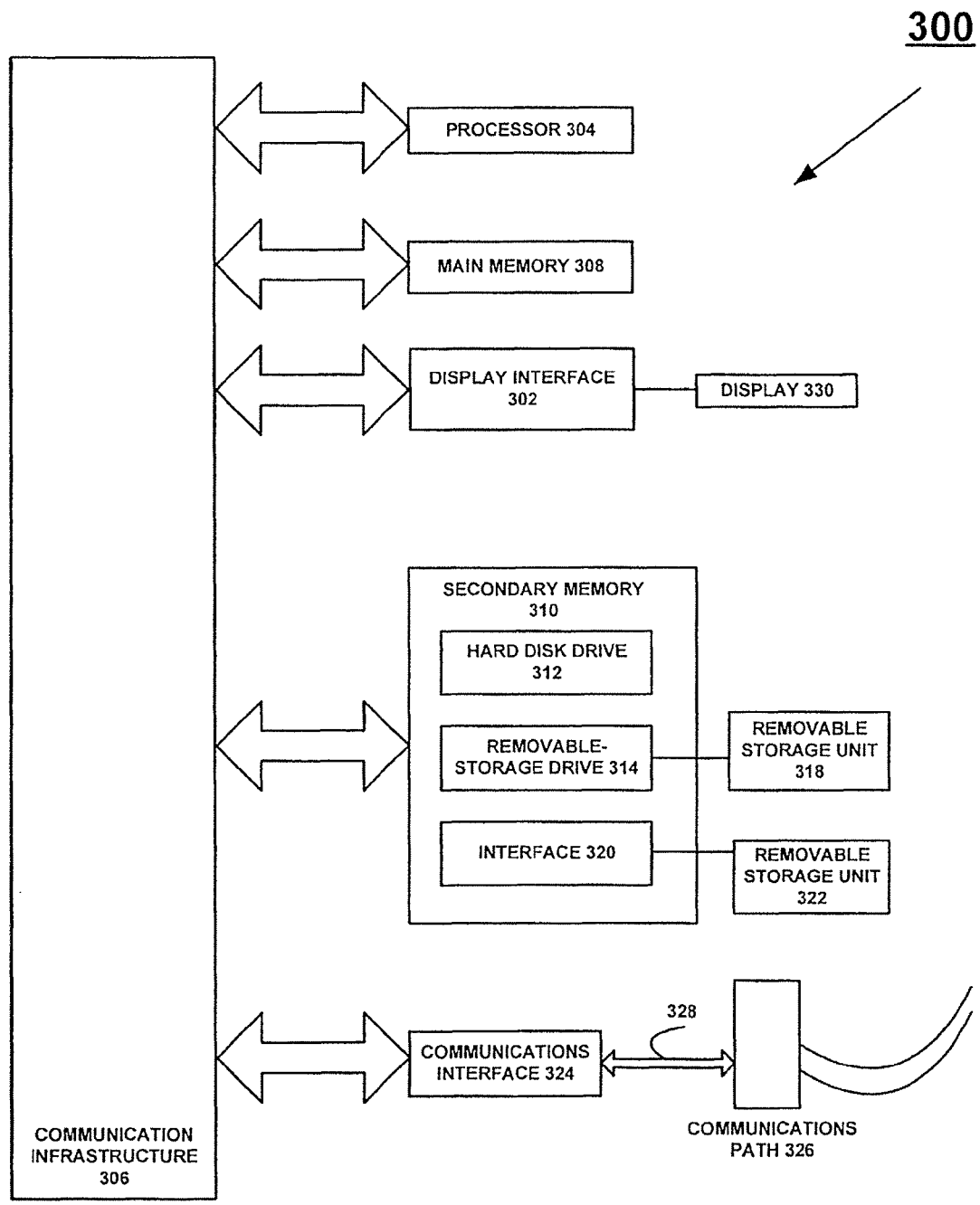
FIG. 3 illustrates an example of a computer system of the present invention.

In fact, in one embodiment, the present invention is directed toward one or more computer systems equipped to carry out the functions described herein. An example of such a computer system 300 is shown in FIG. 3.

The computer system 300 includes at least one processor 304. The processor 304 is connected to a communication infrastructure 306 (e.g., a communications bus, a cross-over bar device, or a network). Although various software embodiments are described herein in terms of this exemplary computer system 300, after reading this description, it will become apparent to a person skilled in the relevant art(s) how to implement the invention using other computer systems and/or architectures.

The computer system 300 includes a display interface 302 that forwards graphics, text, and other data from the communication infrastructure 306 (or from a frame buffer (not shown)) for display on a display unit 330.

The computer system 300 also includes a main memory 308, which preferably is a random access memory (RAM), and may also include a secondary memory 310. The secondary memory 310 may include, for example, a hard disk drive 312 and/or a removable-storage drive 314 (e.g., a floppy disk drive, a magnetic tape drive, an optical disk drive, and the like). The removable-storage drive 314 reads from and/or writes to a removable storage unit 318 in a well-known manner. The removable storage unit 318 may be, for example, a floppy disk, a magnetic tape, an optical disk, and the like, which is written to and read by the removable-storage drive 314. As will be appreciated, the removable storage unit 318 includes a computer-usable storage medium having stored therein computer software and/or data.

In alternative embodiments, the secondary memory 310 may include other similar devices for allowing computer programs or other instructions to be loaded into the computer system 300. Such devices may include a removable storage unit 322 and an interface 320 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 322 and interfaces 320 that allow software and data to be transferred from the removable storage unit 322 to the computer system 300.

The computer system 300 may also include a communications interface 324, which allows software and data to be transferred between the computer system 300 and external devices (not shown). Examples of the communications interface 324 may include a modem, a network interface (e.g., an Ethernet card), a communications port, a Personal Computer Memory Card International Association ("PCMCIA") interface, and the like. Software and data transferred via the communications interface 324 are in the form of signals 328, which may be electronic, electromagnetic, optical or another type of signal that is capable of being received by the communications interface 324. These signals 328 are provided to the communications interface 324 via a communications path 326 (e.g., a channel). The communications path 326 carries the signals 328 and may be implemented using wire or cable, fiber optics, a telephone line, a cellular link, a radio-frequency ("RF") link, or the like.

As used herein, the phrases "computer program medium" and "computer usable medium" may be used to generally refer to a removable storage unit 318 used with the removable-storage drive 314, and/or a hard disk installed in the hard disk drive 312, for example. These computer program products provide software to the computer system 300. The present invention may be implemented or embodied as one or more of such computer program products.

Computer programs (also referred to as computer control logic) are stored in the main memory 308 and/or the secondary memory 310. The computer programs may also be received via the communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the present invention is implemented using software, the software may be stored in a computer program product and loaded into the computer system 300 using the removable-storage drive 314, the hard drive 312, or the communications interface 324. The control logic (software), when executed by the processor 304, causes the processor 304 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

V. Conclusion

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A non-transitory computer-readable medium having stored thereon a plurality of instructions for causing a computer to capture data packets on a network for evaluating response time performance, the plurality of instructions, when executed by a processor, are configured to cause the processor to perform operations comprising:
   capturing a first data packet, the first data packet including an authorization request for a transaction;
   determining that the captured first data packet includes a first pattern in a coded field;
   capturing a second data packet;
   determining that the captured second data packet includes a second pattern in a coded field that corresponds to the first pattern;
   determining that the captured second data packet contains the second pattern, wherein an additional coded field of the captured second data packet is checked to determine that the second data packet matches an additional coded field of the captured first packet to determine whether a match has occurred;
   determining that the response time of the second data packet relative to a transmission time of the first data packet has exceeded a predetermined threshold in response to the determination that the match has occurred; and
   transmitting an alert message, in response to the determination that the response time of the second data packet relative to the transmission time of the first data packet has exceeded the predetermined threshold,
   wherein the alert message includes coded field data from a portion of at least the captured first data packet or captured second data packet,
   wherein the captured first packet and the captured second packet each contain a header portion and a data portion distinct from the header portion,
   wherein the coded field and the at least one additional coded field of the captured first packet are contained within the data portion of the captured first packet, and
   wherein the coded field and the at least one additional coded field of the captured second packet are contained within the data portion of the captured second packet.

2. The non-transitory computer-readable medium according to claim 1, wherein each additional coded field is one of a date, a time, a credit card number, a transaction amount, a reconciliation amount, a position in the data packet, and a length of the field.

3. The non-transitory computer-readable medium according to claim 1, wherein the alert message includes data from the data portion of the first and second packets, the data including at least one coded field, the authorization request, and the response time.

4. The non-transitory computer-readable medium according to claim 1, wherein the predetermined threshold is adjustable.

5. The non-transitory computer-readable medium according to claim 4, wherein the adjustable predetermined threshold is 2 seconds.

6. The non-transitory computer-readable medium according to claim 4, wherein the adjustable predetermined threshold is adjustable to millisecond intervals.

7. The non-transitory computer-readable medium according to claim 1, further comprising transmitting a warning message upon determining that no second data packet is captured having the second pattern within a predetermined time period.

8. The non-transitory computer-readable medium according to claim 7, wherein the predetermined time period is 7 seconds.

9. The non-transitory computer-readable medium according to claim 8, wherein the predetermined time period is adjustable to millisecond intervals.

10. The non-transitory computer-readable medium according to claim 1, wherein the alert message includes at least one of a date, a time, a credit card number, a transaction amount, a reconciliation amount, a position in the data packet, a length of the field, and the response time.

11. The non-transitory computer-readable medium according to claim 1, wherein the data packets are ISO 8583 messages.

12. The non-transitory computer-readable medium according to claim 1, further comprising transmitting a warning message upon determining that a match has not occurred.

13. The non-transitory computer-readable medium according to claim 1, wherein a determination is automatically made on the origin of a delay based upon the transmitted coded field data within the alert message.

14. The non-transitory computer-readable medium according to claim 13, wherein penalties for delays may be validated based upon the determination of delay origin.

15. A computer based system, comprising:
   a computer network communicating with a memory;
   the memory communicating with a processor; and
   the processor, when executing a computer program for causing a computer to capture data packets on a network for evaluating response time performance, is configured to:
   capture a first data packet, the first data packet including an authorization request for a transaction;
   determine that the captured first data packet includes a first pattern in a coded field;
   capture a second data packet;
   determine that the captured second data packet includes a second pattern in a coded field that corresponds to the first pattern;
   determine that the captured second data packet contains the second pattern, wherein an additional coded field of the captured second data packet is checked to determine that the second data packet matches an additional coded field of the captured first packet to determine whether a match has occurred;
   determine that the response time of the second data packet relative to a transmission time of the first data packet has exceeded a predetermined threshold in response to the determination that the match has occurred; and transmit an alert message, in response to the determination that the response time of the second data packet relative to the transmission time of the first data packet has exceeded the predetermined threshold, wherein the alert message includes coded field data from a portion of at least the captured first data packet or captured second data packet, wherein the captured first packet and the captured second packet each contain a header portion and a data portion distinct from the header portion, wherein the coded field and the at least one additional coded field of the captured first packet are contained within the data portion of the captured first packet, and wherein the coded field and the at least one additional coded field of the captured second packet are contained within the data portion of the captured second packet.

16. A method comprising:

capturing, by a computer based system for evaluating response time performance, a first data packet, the first data packet including an authorization request for a transaction;

determining, by the computer based system, that the captured first data packet includes a first pattern in a coded field;

capturing, by the computer based system, a second data packet;

determining, by the computer based system, that the captured second data packet includes a second pattern in a coded field that corresponds to the first pattern;

determining, by the computer based system, that the captured second data packet contains the second pattern, wherein an additional coded field of the captured second data packet is checked to determine that the second data packet matches an additional coded field of the captured first packet to determine whether a match has occurred;

determining, by the computer based system, that the response time of the second data packet relative to a transmission time of the first data packet has exceeded a predetermined threshold in response to the determination that the match has occurred; and transmitting, by the computer based system, an alert message, in response to the determination that the response time of the second data packet relative to the transmission time of the first data packet has exceeded the predetermined threshold, wherein the alert message includes coded field data from a portion of at least the captured first data packet or captured second data packet, wherein the captured first packet and the captured second packet each contain a header portion and a data portion distinct from the header portion, wherein the coded field and the at least one additional coded field of the captured first packet are contained within the data portion of the captured first packet, and wherein the coded field and the at least one additional coded field of the captured second packet are contained within the data portion of the captured second packet.

* * * * *